United States Patent
Goslin et al.

(10) Patent No.: US 9,704,491 B2
(45) Date of Patent: Jul. 11, 2017

(54) STORYTELLING ENVIRONMENT: DISTRIBUTED IMMERSIVE AUDIO SOUNDSCAPE

(71) Applicant: Disney Enterprises, Inc., Burbank, CA (US)

(72) Inventors: Michael P. Goslin, Sherman Oaks, CA (US); Ron C. Fish, Toluca Lake, CA (US); David J. Logan, Lomita, CA (US); Reek N. Havok, Long Beach, CA (US); Susan M. Lum, La Mirada, CA (US)

(73) Assignee: Disney Enterprises, Inc., Burbank, CA (US)

( * ) Notice: Subject to any disclaimer, the term of this patent is extended or adjusted under 35 U.S.C. 154(b) by 106 days.

(21) Appl. No.: 14/619,911

(22) Filed: Feb. 11, 2015

(65) Prior Publication Data
US 2015/0243286 A1  Aug. 27, 2015

Related U.S. Application Data

(60) Provisional application No. 61/938,655, filed on Feb. 11, 2014.

(51) Int. Cl.
*G10L 19/00* (2013.01)
*H04R 29/00* (2006.01)
(Continued)

(52) U.S. Cl.
CPC .......... *G10L 19/0017* (2013.01); *A63F 13/30* (2014.09); *A63F 13/54* (2014.09);
(Continued)

(58) Field of Classification Search
CPC .................. G10L 19/008; G10L 19/0017
(Continued)

(56) References Cited

U.S. PATENT DOCUMENTS 8,170,884 B2  5/2012 Vaudrey et al.
8,472,631 B2  6/2013 Klayman et al.
(Continued)

FOREIGN PATENT DOCUMENTS

WO  2014036121 A1  3/2014

OTHER PUBLICATIONS

Kim et al. "Mobile Maestro: Enabling Immersive Multi-Speaker", UbiComp '14, Sep. 13-17, 2014, Seattle, WA, 12 pages. Retrieved from: <http://dl.acm.org/citation.cfm?id=2636077>.

*Primary Examiner* — Shaun Roberts
(74) *Attorney, Agent, or Firm* — Patterson + Sheridan, LLP

(57) ABSTRACT

Systems, methods and articles of manufacture for outputting an audio effect on a remote device are disclosed. Embodiments select a device from a plurality of devices within a physical environment for use in outputting an audio effect. Upon determining that transmitting the audio effect as uncompressed data to the selected device would violate a predefined performance criteria, the audio effect is modified by determining, for each of a plurality of portions of the audio effect, a respective priority. Additionally, upon determining that a first portion of the plurality of portions of the audio effect is a lower priority, relative to a second portion of the audio effect, embodiments compress the first portion of the audio effect, while the second portion of the audio effect remains uncompressed. The modified audio effect is then transmitted to the selected device for playback.

19 Claims, 7 Drawing Sheets

(51) Int. Cl.
*A63F 13/30* (2014.01)
*A63F 13/54* (2014.01)
*A63H 5/00* (2006.01)
*G10L 19/22* (2013.01)

(52) U.S. Cl.
CPC ............... *A63H 5/00* (2013.01); *H04R 29/00* (2013.01); *A63H 2200/00* (2013.01); *G10L 19/00* (2013.01); *G10L 19/22* (2013.01)

(58) Field of Classification Search
USPC .............................................. 704/200.1, 500
See application file for complete search history.

(56) References Cited

U.S. PATENT DOCUMENTS

| | | | |
|---|---|---|---|
| 8,751,028 | B2 | 6/2014 | Yuen et al. |
| 8,834,266 | B2 | 9/2014 | Thorner |
| 8,837,743 | B2 | 9/2014 | Aarts et al. |
| 2004/0044520 | A1* | 3/2004 | Chen .................. G10L 19/0017 704/200.1 |
| 2005/0222841 | A1 | 10/2005 | McDowell |
| 2009/0052873 | A1* | 2/2009 | Miyagoshi ............... H04N 5/91 386/291 |
| 2010/0079374 | A1* | 4/2010 | Cortenraad ........... G06F 3/0346 345/158 |
| 2011/0116651 | A1 | 5/2011 | Gunn et al. |
| 2011/0142243 | A1 | 6/2011 | Wee et al. |
| 2012/0050570 | A1* | 3/2012 | Jasinski .................. G11B 27/28 348/231.4 |
| 2012/0124109 | A1* | 5/2012 | Vecera ............... G06F 17/30153 707/823 |
| 2012/0290306 | A1* | 11/2012 | Smyth ................... G10L 19/032 704/500 |
| 2013/0024190 | A1 | 1/2013 | Fairey |
| 2013/0089208 | A1 | 4/2013 | Fairey |
| 2014/0072121 | A1 | 3/2014 | Harma et al. |
| 2014/0119551 | A1 | 5/2014 | Bharitkar et al. |
| 2014/0133683 | A1 | 5/2014 | Robinson et al. |
| 2014/0146984 | A1 | 5/2014 | Kim et al. |
| 2014/0256214 | A1* | 9/2014 | Ramamoorthy ......... A63H 3/28 446/297 |

* cited by examiner

STORYTELLING ENVIRONMENT: DISTRIBUTED IMMERSIVE AUDIO SOUNDSCAPE

CROSS-REFERENCE TO RELATED APPLICATIONS

This application claims benefit of U.S. provisional patent application Ser. No. 61/938,655, filed Feb. 11, 2014, which is herein incorporated by reference in its entirety.

BACKGROUND

Field of the Invention

The present invention generally relates to home entertainment, and more specifically to techniques for providing an immersive playtime environment using interactive devices.

Description of the Related Art

Computer graphics technology has come a long way since video games were first developed. Relatively inexpensive 3D graphics engines now provide nearly photo-realistic interactive game play on hand-held video game, home video game and personal computer hardware platforms costing only a few hundred dollars. These video game systems typically include a hand-held controller, game controller, or, in the case of a hand-held video game platform, an integrated controller. A user interacts with the controller to send commands or other instructions to the video game system to control a video game or other simulation. For example, the controller may include a joystick and buttons operated by the user.

While video games allow the user to interact directly with the video game system, such interactions primarily influence the graphical depiction shown on the video game device (or on a connected display), and rarely influence any other objects outside of the virtual world. That is, a user may specify an input to the video game system, indicating that the user's avatar should perform a jump action, and in response the video game system could display the user's avatar jumping. However, such interactions are typically limited to the virtual world, and any interactions outside the virtual world are limited (e.g., a hand-held gaming device could vibrate when certain actions occur).

Generally, with respect to audio equipment, sound quality and cost savings are frequently at odds with one another. That is, while high quality audio equipment can be manufactured that produces very high quality audio output, such audio equipment is typically expensive to produce. Likewise, inexpensive audio output devices can be manufactured frequently such devices are limited in terms of the frequencies they can output and generally the sound quality is lower on very inexpensive devices. Moreover, some devices may lack the computing resources (e.g., processor, memory, communication module, etc.) to receive and playback high quality audio. For example a particular device may have insufficient memory capacity to store an uncompressed version of a particular audio effect, and thus such a device may be required to use a compressed, lower quality version of the audio effect.

SUMMARY

One embodiment provides a non-transitory computer-readable medium containing computer program code, that, when executed, performs an operation. The operation includes selecting a device from a plurality of devices within a physical environment for use in outputting an audio effect. The operation further includes, upon determining that transmitting the audio effect as uncompressed data to the selected device would violate a predefined performance criteria, modifying the audio effect. Modifying the audio effect includes determining, for each of a plurality of portions of the audio effect, a respective priority and, upon determining that a first portion of the plurality of portions of the audio effect is a lower priority, relative to a second portion of the audio effect, compressing the first portion of the audio effect. The second portion of the audio effect remains uncompressed. The operation also includes transmitting the modified audio effect to the selected device.

Another embodiment provides a storytelling device that includes a processor, a communication module and a memory containing an audio effect and a program that, when executed by the processor, performs an operation. The operation includes selecting a device from a plurality of devices within a physical environment for use in outputting an audio effect. The operation further includes, upon determining that transmitting the audio effect as uncompressed data to the selected device would violate a predefined performance criteria, modifying the audio effect. Modifying the audio effect includes determining, for each of a plurality of portions of the audio effect, a respective priority and, upon determining that a first portion of the plurality of portions of the audio effect is a lower priority, relative to a second portion of the audio effect, compressing the first portion of the audio effect. The second portion of the audio effect remains uncompressed. The operation also includes transmitting the modified audio effect to the selected device.

Yet another embodiment provides a storytelling device that includes a processor, a communication module and a memory containing an audio effect and a program that, when executed by the processor, performs an operation. The operation includes receiving, from a controller device, the modified audio effect for output. Additionally, the operation includes identifying predefined low-frequency audio data associated with the transmitted modified audio effect. The operation further includes combining the identified predefined low-frequency audio data with the transmitted modified audio effect to produce combined audio data. The operation also includes outputting the combined audio data for playback.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
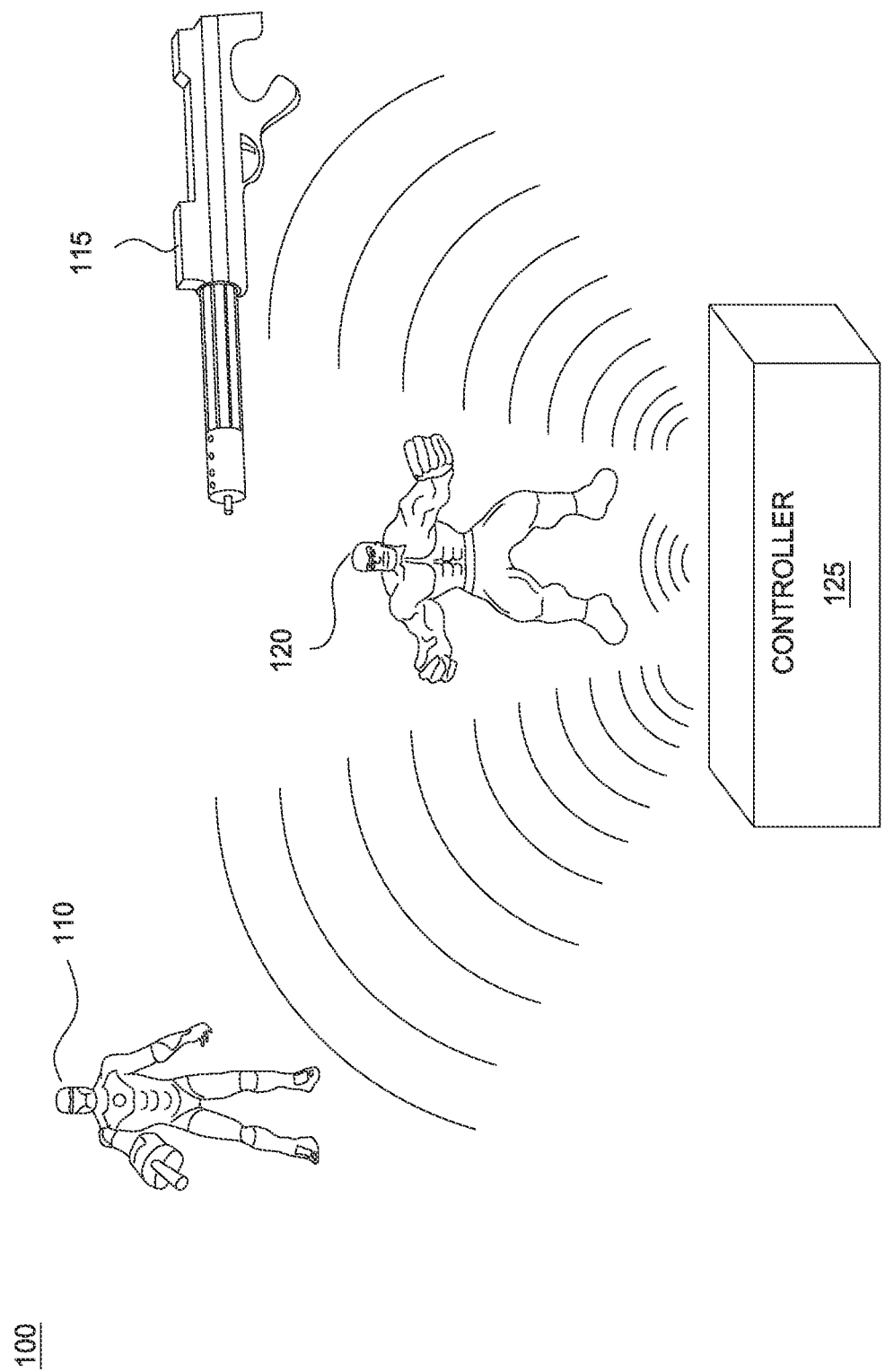
FIG. 1 illustrates a playtime environment in which a controller is instructing interactive devices, according to one embodiment described herein.

Generally, embodiments described herein provide techniques for outputting an audio effect on a remote device are disclosed. For instance, in one embodiment, a device is selected from a plurality of devices within a physical environment for use in outputting an audio effect. Upon determining that transmitting the audio effect as uncompressed data to the selected device would violate a predefined performance criteria, embodiments modify the audio effect by determining, for each of a plurality of portions of the audio effect, a respective priority and, upon determining that a first portion of the plurality of portions of the audio effect is a lower priority, relative to a second portion of the audio effect, compressing the first portion of the audio effect, while the second portion of the audio effect remains uncompressed. The modified audio effect is then transmitted to the selected device.

Particular embodiments are described herein with respect to an immersive storytelling environment in which a story is played back through the interaction of storytelling devices (also referred to as interactive devices). More specifically, embodiments may use various storytelling devices, each capable of producing some auditory and/or visual effect, to create an immersive and interactive storytelling experience for a user. Such a system may include a variety of storytelling devices and a controller, connected via a network (e.g., an RF communications network). Each storytelling device generally represents any device capable of enhancing a storytelling experience, in response to user input (or some stimuli) a current context of a story. For instance, the controller device could configure the storytelling devices with stimulus and response information, based on a current context of a story. As an example, the controller device could configure a particular storytelling device to generate audiovisual messages responsive to a certain stimulus event (e.g., a user performing a particular action), and to perform another action responsive to other stimulus (e.g., the user not performing the particular action within a predefined window of time). Generally, the controller may be one of the plurality of storytelling devices, or the controller could be a stand-alone device (e.g., a computing device executing a control application).

Generally, each of the storytelling devices can have different capabilities in terms of audio output devices and audio processing and storage capabilities. For instance, a first device may include multiple higher quality speakers and a greater amount of audio processing and storage resources, while another storytelling device can include a relatively limited speaker and relatively limited audio processing and storage resources. This could be because, for instance, higher quality speakers, processing and storage resources are generally more expensive, and it can be desirable for economic reasons for certain storytelling devices to be lower cost devices.

As a result, certain audio effects may have a higher quality sound when played using the hardware of a particular storytelling device, relative to when the audio effect is played using another storytelling device with more limited hardware. As such, embodiments can tailor audio output during a storytelling experience such that that an optimal device is selected for particular sound effects during the story. For instance, in an Iron Man® themed story, a particular audio effect could represent Jarvis' voice giving instructions and updates to the player as part of the story. As the character Jarvis is not represented by any of the storytelling devices used to play out the story, it could be thematically appropriate to output the audio effect representing Jarvis' voice through any of multiple storytelling devices used in the story. As such, embodiments could select one of the storytelling devices best suited to output the audio effect with the highest quality (e.g., the storytelling device having the speakers, processing and storage capabilities best suited for outputting the particular audio effect) and could instruct the selected device to output the audio effect. Moreover, such devices can be selected dynamically throughout the story, as devices may enter and exit the story playback for a variety of reasons (e.g., a new device is brought into the physical area where the story is being played out, a device runs out of battery power, etc.).

In some cases, embodiments can alter a particular sound effect based on properties of the device outputting the sound effect. For example, embodiments could retrieve an equalizer profile corresponding to a particular device and could apply the equalizer profile to the audio effect, thereby optimizing the audio effect for output on the particular device. As another example, a control device could determine that a particular device is incapable of outputting a certain audio effect if the audio effect is composed of entirely uncompressed data (e.g., due to memory and data transmission limitations of the device). As such, the control device could compress only a portion of the audio effect (e.g., the latter part of the audio effect) while leaving the remaining portion of the audio effect uncompressed, such that the storytelling device is now capable of outputting the partially compressed audio data. In doing so, the control device could be configured to selectively determine which portion of the audio effect to compress and which portion to leave uncompressed (or to compress but using a higher bit rate encoding), based on the content of the audio effect. For example, a particular audio effect could include an attack sound corresponding to a virtual laser blast and could then include residual sounds corresponding to the after effects of the virtual laser blast. In this example, the controller could determine that the attack sound is a higher priority sound in terms of enhancing the user experience, and thus could create a sound effect in which the attack sound portion is represented with uncompressed audio data and in which the residual sound is represented using compressed audio data with a relatively low bit rate encoding. Doing so allows the sound effect to be played on a storytelling device having more limited audio processing capabilities and produces a higher quality sound than if the entire audio effect were compressed at a constant bit rate, thereby enhancing the user experience.

Additionally, in some cases the storytelling devices can be configured to work in unison to output a particular sound effect. For instance, a single sound effect could be output on multiple devices in unison in order to create a stereophonic or surround-sound experience for the user. In doing so, a slight time delay can be introduced in the playback of the sound effect across the multiple devices, to avoid phase cancellation between the sound effects being output by the devices. As another example, the devices can be configured to output the sound effect with a more significant time delay in order to create a particular auditory effect for the user. For example, in a story that simulates the user being within a bee hive, the various storytelling devices could each output the sound of a bee buzzing with a time delay in between the output of each of the devices, such that the sound of the bee buzzing appears to move throughout the physical environment. Thus, if the user is positioned between the various storytelling devices used in the playback of the story, the sound of the bee buzzing could appear to encircle the user, thus creating an immersive auditory experience for the user and enhancing the realism of the story.

An example will now be discussed with respect to FIG. 1, which illustrates a playtime environment in which a controller is instructing interactive devices to perform an effect, according to one embodiment described herein. As shown, the system 100 includes an Iron Man® action figure 110, a Star Wars® blaster rifle 115, a Hulk® action figure 120, and a controller device 125. Here, the toys 110, 115 and 120 are generally capable of producing audiovisual effects (e.g., audio output, light effects, movement effects such as vibration, etc.). In one embodiment, the toys 110, 115 and 120 may be configured with an action disc device. Of note, while various examples are discussed herein with respect to the toy devices 110, 115 and 120, it is broadly contemplated that these techniques can be utilized with any number of devices and any types of devices, consistent with the functionality described herein.

However, while the toys 110, 115 and 120 are capable of producing audiovisual effects, the toys 110, 115 and 120 may not be configured with logic to determine when conditions in the physical environment indicate a particular effect should be performed. This may be due to, in part, the cost and complexity of configuring each toy 110, 115 and 120 with the logic and hardware resources to detect stimuli in the physical environment and to perform a contextually appropriate audiovisual effect in response synchronously with other devices. As such, the toys 110, 115 and 120 could be configured to receive commands (e.g., from controller 125) and to perform an audiovisual effect(s) responsive to the received commands. Doing so allows the toys 110, 115 and 120 to be produced much more economically, while maintaining the capability to perform audiovisual effect(s) as part of a storytelling or playtime experience.

For example, as part of a Star Wars® storytelling experience, the storyline could indicate that devices within the physical environment should play a particular sound effect when the user performs a predefined gesture to use the "force." As such, the controller 125 could monitor the user's behavior to detect when the user has performed the predefined gesture. For example, the controller 125 could use one or more camera devices (e.g., within the controller devices 125, within one or more of the toys 110, 115 and 120, etc.) to monitor the user's movement within the physical environment. As another example, the user could wear an article (e.g., a bracelet) configured with an accelerometer device and capable of reporting data describing the user's movement to the controller device 125.

Upon detecting the user has performed the predefined gesture, the controller 125 could broadcast a command to the toy devices 110, 115 and 120, instructing the toy devices 110, 115 and 120 to synchronously perform an audiovisual effect. Such a command could be broadcast, for example, via a radio-frequency transmitter, an infrared emitter, an ultrasound transmitter, and so on. More generally, any communications protocol may be used for the communication between the controller and the toy devices 110, 115 and 120, consistent with the functionality described herein.

The toy devices 110, 115 and 120 could then receive the command and could perform the specified audiovisual effect in synchrony. For example, in the event the command specifies to play a particular sound effect, each of the toy devices 110, 115 and 120 could output the particular sound effect in synchrony with the other toy devices, thereby creating an improved sensorial experience for the user, relative to any of the toy devices 110, 115 and 120 playing the sound effect individually. Here, the sound effect could be, e.g., a sampled sound effect or a function-generated sound effect. Moreover, as discussed above, by playing the sound effect synchronously with one another, the toy devices 110, 115 and 120 can compensate for each other's weaknesses (e.g., a particular toy device being capable of outputting sounds within a limited frequency range), thereby producing an improved sound effect and sensorial immersion for the user.

While any number of toy devices can be used, the sense of immersion experienced by the user generally scales with the number of devices performing audiovisual effects in synchrony. For example, the controller 125 could detect when the user pulls the trigger to fire the blaster gun 115, and in response, could broadcast a command to all of the toy devices 110, 115 and 120 to output the sound effect of the blast being fired. Additionally, the controller 125 could instruct the toy devices 110, 115 and 120 to perform additional audiovisual effects, such as flashing lights and movements, in response to the user firing the blaster. Doing so helps to overload the user's senses, thereby creating a more immersive and realistic playtime experience.

Generally, a variety of techniques may be used to configure the toy devices 110, 115 and 120 to synchronously output the audiovisual effect. In one embodiment, the toy devices 110, 115 and 120 could be configured to output the audiovisual effect immediately upon receiving the command from the controller 125. Such an embodiment may be preferable when the toy devices 110, 115 and 120 receive the command at substantially the same time and when the toy devices 110, 115 and 120 take substantially the same amount of time to process the command and to perform the corresponding audiovisual effect. As another example, each of the toy devices 110, 115 and 120 (as well as the controller 125) could maintain an internal clock whose time is synchronized to the internal clock of the other toy devices, and the command transmitted by the controller 125 could specify a time at which to perform the audiovisual effect. Generally, any technique suitable for use in synchronizing the internal clocks may be used, consistent with the present disclosure. Examples of such techniques include, without limitation, Network Time Protocol (NTP), Precision Time Protocol (PTP), Reference Broadcast Time Synchronization, and so on.

The controller 125 can be configured to selectively output audio effects on the devices 110, 115 and 120 in a way that optimizes the sound quality of the audio effects. For example, the controller 125 could determine that the Hulk® device 120 has relatively limited audio output and processing capabilities. Such a device may have limited audio output and processing capabilities, for instance, due to a desire to manufacture the device at a lower cost so that the device is more affordable for consumers. However, due to the more limited audio playback capabilities, the device 120 may be incapable of playing back a particular audio effect using entirely uncompressed audio data. For instance, the device 120 may have insufficient memory to store the uncompressed audio data. Moreover, while the entirety of the audio effect could be uniformly compressed such that the audio data can fit into memory of the device 120, such a compression scheme fails to account for portions of the audio effect that may be more important to the user experience.

As such, the controller 125 could selectively compress portions of the audio effect, such that less important portions of the audio data are represented using compressed data and more important portions of the audio data are represented using uncompressed data (or high bit rate compressed data). For instance, a first portion of the sound effect could include the dialogue "Hulk smash!" while a second portion of the sound effect includes an angry roar. In such an example, it could be preferable for the dialogue portion to be represented using uncompressed audio data in order to preserve the clarity of the dialogue, while it could be acceptable to represent the roar with compressed data at a lower bit rate encoding. In one embodiment, the controller is configured with priority data corresponding to the audio effects used within a particular story and the controller is configured to use such priority data to determine whether to compress particular portions of an audio effect and, if so, how to compress the portions. For example, such priority data could be included as part of a particular story (e.g., a story downloaded from a remote server for playback using available storytelling device).

For example, the controller 125 could access priority data describing a respective priority of each of a plurality of portions of a particular audio effect and could use such priority data to selectively compress lower priority portions of the audio effect. For example, the controller 125 could generate modified audio data where dialogue (e.g., a high priority portion of audio) is represented using uncompressed audio data and the remaining portion of the audio data (e.g., the data corresponding to Hulk's roar) is represented using low bit rate compressed data. By doing so, the controller 125 ensures that the device 120 is capable of playing back the audio effect (i.e., in this example, by ensuring the data for the audio effect is sufficiently sized to fit into the device's 120 memory) while optimizing sound quality of the audio data for playback on the device 120. Moreover, by selectively compressing portions of the audio data, the controller 125 can preserve the quality of higher priority portions of the audio data (which may remain uncompressed or could be compressed using a higher bit rate encoding).

Additionally, the controller 125 could be configured to selectively playback certain audio effects on the devices 110, 115 and 120, based on which device is best suited for the playback of each particular audio effect. For instance, a particular Iron Man® themed story could include audio effects representing dialogue from Jarvis, where Jarvis is not directly represented by any of the storytelling devices 110, 115 and 120 used in the playback of the story. As such, the controller 125 could select one of the storytelling devices 110, 115 and 120 that is best suited to output the audio effect with the highest quality sound. Thus, the controller 125 could determine that the toy blaster rifle 115 has the optimal speaker configuration and audio processing capabilities to output the sound effects representing Jarvis' dialogue and could transmit the corresponding audio data to the blaster rifle 115 for output.

Of note, the controller 125 can be configured to dynamically determine the optimal storytelling device(s) for outputting a particular sound effect, as the available storytelling devices can change from story to story and can even change within the playback of a single story. For example, during the playback of a particular story, the Iron Man® action figure 110 could run low on battery power and could be removed from the story as a result. As such, the controller 125 could remove the Iron Man® action figure 110 from consideration when subsequently placing audio effects. As another example, the user's friend could visit the user's house and could bring a fourth storytelling device into the playback of the story. As such, the controller 125 could consider the fourth storytelling device in addition to the devices 110, 115 and 120 when searching for an optimal device to output subsequent audio effects.

Figure 2:
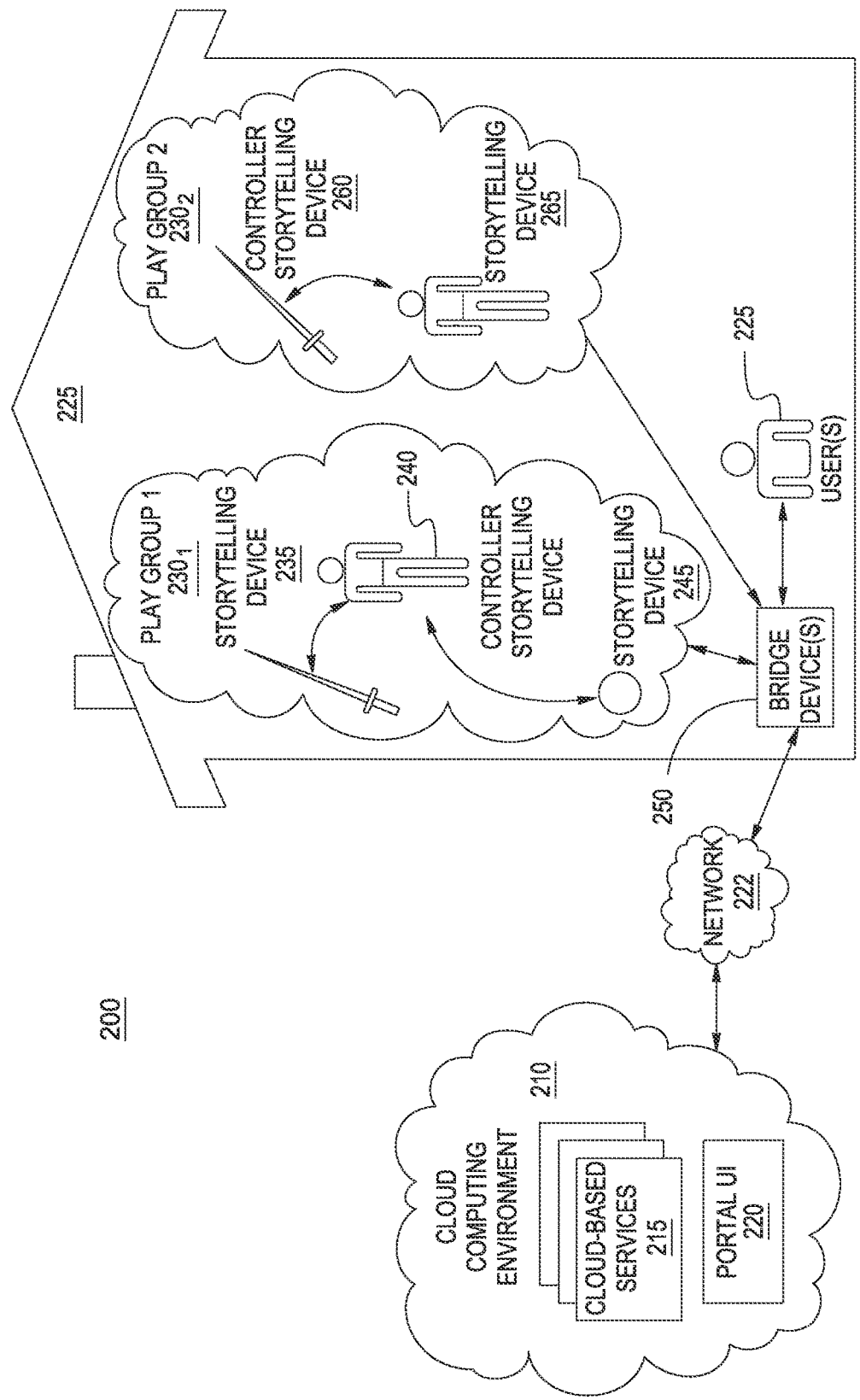
FIG. 2 illustrates a storytelling environment with a plurality of playgroups, according to one embodiment described herein.

FIG. 2 illustrates an example storytelling environment, according to one embodiment. As shown, the environment 200 includes a cloud computing environment 210 and a home environment 225, interconnected via network 222. The home environment 225 includes two playgroups $230_{1-2}$ of storytelling devices, as well as a user(s) 255 and a bridge device(s) 250. Here, the user may connect to the bridge device 250 via an application (e.g., executing on a mobile device, rendered within a web browser, etc.). The cloud computing environment 210 hosts a plurality of services 215 and a portal user interface 220.

Generally, cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. Doing so allows a user to access information and the services 215 from any computing system attached to a network connected to the cloud (e.g., the Internet).

Each playgroup $230_{1-N}$ generally represents a set of storytelling devices involved in a unique storytelling or playtime experience. For instance, the playgroup $230_1$ represents a science fiction-themed storytelling experience and includes a light sword storytelling device 235, an action figure controller storytelling device 240, and a trainer storytelling device 245. Likewise, the playgroup $230_2$ also represents a science fiction-themed storytelling experience and includes a light sword controller storytelling device 260 and an action figure storytelling device 265. More generally, however, the playgroups may contain any number of storytelling devices of any number of different themes and types.

Generally, the playgroups 230 include storytelling devices within a particular physical location (e.g., a room of the house environment 225). That is, it may be preferable for a storytelling experience to only interact with storytelling devices within its immediate physical proximity (e.g., within the same room), as to do otherwise can potentially create security and other problems during the storytelling experience. A number of different techniques may be used to determine which storytelling devices are within immediate physical proximity of one another. For example, one or more of the storytelling devices could emit a first signal (e.g., an infrared signal) and the other storytelling devices could be configured to transmit a response (e.g., a radio frequency signal (RF)) upon receiving the first signal. The storytelling device(s) could then receive the responses from the other storytelling devices and could create a playgroup 230 that includes the other storytelling devices as well as the one or more storytelling devices.

Generally, it is advantageous for the first signal to be transmitted using a technique that does not readily pass through barriers such as the walls of a house (e.g., emitting infrared light), so as to detect only nearby storytelling devices that are within the same physical environment as the storytelling device. That is, while particular signals (e.g., RF signals) may be suited for inter-device communications, these signals may not be ideal for detecting nearby storytelling devices as they may readily permeate through barriers such as the walls of the house. Doing so helps to ensure that a storytelling experience will not make use of storytelling devices in different rooms of a residence or potentially within different residences altogether.

As shown, the devices 240 and 260 have been elected as controller devices within the playgroups $230_{1-2}$. Generally, a controller device configures each of the storytelling devices within a playgroup to perform certain actions in response to a detected stimulus event and a current context of the story being told. Since acting as a controller device may result in more processing and data transmissions operations, serving as the controller device may also consume more battery power. As such, when two or more devices capable of serving as the controller device are present within a playgroup 230, embodiments can consider the current battery charge and battery capabilities of the capable devices when selecting one of the devices to serve as the controller.

As discussed above, devices can join and leave the playgroups 230 during the playback of a story. As such, the controller devices 240 and 265 can be configured to dynamically determine an optimal device(s) for the playback of a particular audio effect and can optimize the audio effect for playback on the determined device, based on the devices currently active within the respective playgroup 230. Doing so allows audio effects to be played back with the highest sound quality possible using the available devices, thereby enhancing the user experience during the story.

Here, the story may include a number of different contexts in a temporal order, and the playback of the story may advance from one context to the next until the last context is reached and the storytelling experience is complete. However, while the story may be linear in progression, this is not necessary. For example, a story could have different branches, where the story can proceed down one of many possible arcs. For instance, arcs could be randomly selected, selected based on a user's request (e.g., the user specifying which arc should be taken), selected based on the user's actions (e.g., the user manages to "rescue" one of the fictional characters in the story), selected based on the user's history of actions (e.g., whether the user is trending towards the "dark side" in a science fiction storyline), and so on. Moreover, the story may be modified dynamically during playback based on various actions, such as one of the storytelling devices becoming unavailable (e.g., losing power, leaving the physical environment, etc.) or a new storytelling device being introduced to the environment (e.g., the user's friend comes over to play, bringing one or more new storytelling devices with him).

Additionally, the controller may maintain state information and control game logic for the playgroup 230. For example, playgroup $230_1$ could be playing out a story in which a user is asked by the action figure device 240 to deflect virtual laser beams fired from the trainer device 245, using the light sword device 235. Here, the elected controller device (i.e., action figure 240) could maintain a "hit points" value for the user that is decremented when the user fails to deflect one of the virtual lasers, and could further maintain a count of how many virtual lasers the user has deflected thus far. Additionally, the controller could retrieve state data for the user (e.g., by querying one of the cloud-based services 215 with an identifier for the user) and could use the user state data to adjust the playback of the story.

In addition to detecting nearby storytelling device within the same physical environment, the storytelling devices within a playgroup 230 may elect one of the storytelling devices as a controller storytelling device. A number of different techniques may be used for such an election. For example, a user could explicitly specify that a particular one of the storytelling devices (e.g., the user's favorite device) should be used as the controller. Here, it may be preferable for the user to select a device that will remain with the user throughout the storytelling experience, so as to avoid a subsequent controller election part-way through the story. In one embodiment, the controller may be elected based on technical specifications and properties of the storytelling devices. For example, a storytelling device with a substantial amount of memory, processing power and communication bandwidth may be preferable as the controller, relative to a device having a lesser amount of computing resources.

As discussed above, the story may generally include stimulus events and corresponding actions, and may be linear in progression or dynamic (e.g., a story that includes different story arcs or branches). In one embodiment, the story may be defined such that each corresponding action is attribute to a type or role of storytelling device (i.e., as opposed to a specific storytelling device). In mapping the story to the available and compatible storytelling devices, the controller device 220 could determine a type of each of the storytelling devices, and could assign particular stimulus events and corresponding actions to each of the storytelling devices based on the determined type. For example, a particular story could state that an action should be performed by a storytelling device having the role of "Hero", and the controller could map the action onto a storytelling device within the playgroup having the role "Hero".

For instance, assuming that the storytelling device 240 represents a first fictional character action figure, the controller 240 could assign any stimulus events and actions within the story that are specific to the fictional character to the action figure 240. Likewise, if the story includes any stimulus events and actions designated for a hero-type character in the science fiction universe, the controller 240 could assign these stimulus events and the corresponding actions to the device 240 as well. In the event multiple storytelling devices are available that satisfy the criteria for a stimulus event/action combination (e.g., multiple hero devices are present and available within the playgroup), the controller 240 could select one of the storytelling devices to perform each of the stimulus event/action combinations. The controller could use a number of different techniques for mapping the actions to the compatible devices, including a random mapping algorithm, a load balancing algorithm (e.g., round robin), user preferences (e.g., assigning more actions to a device the user has identified as his favorite), explicit user instructions (e.g., allowing a user to customize the story, such as selecting which character will narrate the story), and so on. In one embodiment, the controller is configured to consider the audio output and processing capabilities of the various compatible devices, when selecting one of the devices to perform a given action to a particular stimulus event. For example, when assigning a dialogue action to one of the devices, the controller could select a device capable of outputting the dialogue action with the greatest sound quality, in lieu of another device capable of outputting the dialogue with a relatively poor sound quality. Advantageously, dynamically mapping the story onto the available and compatible devices allows the story to be used with various different storytelling devices and combinations of storytelling devices.

In one embodiment, the story may specify a distinct, contextually appropriate action to perform for various types of storytelling devices for a given stimulus event. That is, the controller could determine that a particular story includes a stimulus event designated for a hero character, and could specify a corresponding action designated for a action figure 240 and a separate, distinct action designated for an different hero character-based device. In such an embodiment, upon selecting one of the devices to respond to the stimulus event, the controller could assign the corresponding action to the device based on the device's type. Doing so helps to create a more immersive and realistic storytelling experience for the user, as the storytelling devices can be configured to react to stimulus events in a manner appropriate for the represented fictional character.

Once the controller maps the story onto the devices, the controller configures each of the storytelling devices with a number of stimulus events and corresponding effects relating to a first context of the story. As an example, the action figure 240 could detect when the user has successfully deflected a virtual laser fired from the storytelling device 245 (i.e., an occurrence of the stimulus event), and could audibly congratulate the user in response (i.e., performing the corresponding effect).

In some cases, the controller (e.g., controller device 240) can map a particular audio effect to multiple devices for playback. The playback on the multiple devices can be done in unison or by using a time delay across the various devices. For example, a slight time delay could improve the sound quality of a particular audio effect by avoiding phase cancellation of the audio output by the various devices. By doing so, the controller can achieve a stereoscopic or surround sound effect.

Figure 3:
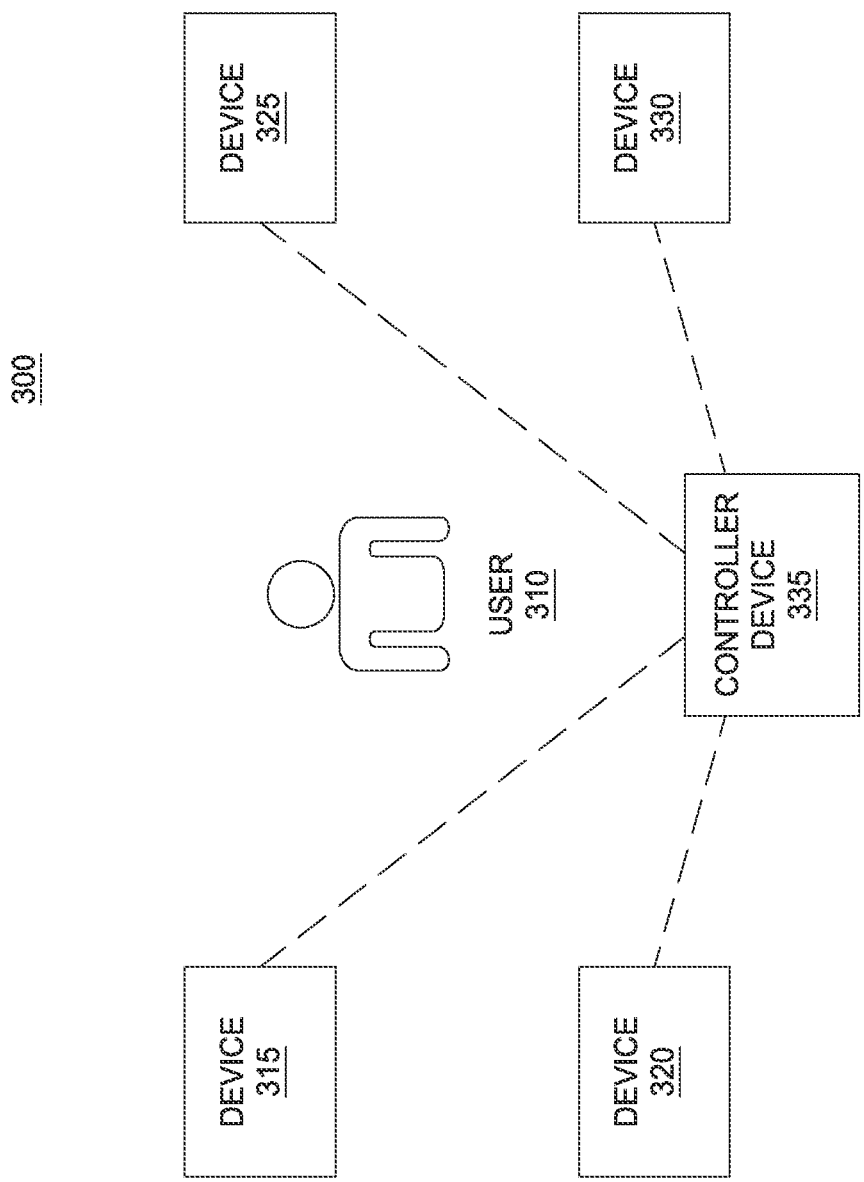
FIG. 3 illustrates a physical environment including storytelling devices and a user, according to one embodiment described herein.

FIG. 3 illustrates a physical environment including storytelling devices and a user, according to one embodiment described herein. As shown, the environment 300 includes a user 310 surrounded by a number of storytelling devices 315, 320, 325 and 335 as well as a controller device 335. Generally, the controller device 335 can select two or more of the devices 315, 320, 325 and 330 to output a particular sound and can generate a schedule by which the selected devices should output the sound. For instance, such a schedule could specify that the selected devices should output the sound in unison or could specify that each of the selected devices should output the sound effect at a different point in time, so as to introduce a time delay between the audio output of each device.

For example, a particular story having a jungle theme could include ambient sound effects that simulate the sounds of a jungle, including birds chirping, insects buzzing, the sound of a distant waterfall, and so on. In outputting the ambient sound effects, the controller device 335 could distribute the various sound effects across the devices 315, 320, 325 and 330 (with some potentially output by the controller device 335 itself) and could generate a timing schedule by which the various sound effects should be played by the devices 315, 320, 325 and 330. For example, the schedule could specify that the sound effects should be temporally staggered (i.e., not all played at the same time) and could distribute the sound effects across the devices 315, 320, 325 and 330, so as to create a three-dimensional soundscape for the user 310.

Additionally, as discussed above, the controller device 335 can consider the individual audio playback and processing capabilities of the devices 315, 320, 325 and 330 when distributing the sound effects, so as to optimize the distribution of the sound effects to the most appropriate device 315, 320, 325 and 330. For example, a first sound effect could correspond to the beat of jungle drums and could include significant low frequency sounds, while a second sound effect could correspond to the sound of a distant waterfall and includes primarily medium frequency sounds. As such, the controller device 335 could assign the sound effect of the drum beat to one of the devices 315, 320, 325 and 330 having audio output capabilities best suited to playing low frequency sounds, and could assign the waterfall sound effect to a device with more limited audio playback capabilities that is better capable of playing the primarily mid-range sound effect. Advantageously, doing so allows the controller device 335 to optimize the assignments of the individual devices when creating the soundscape for the user 310.

In one embodiment, the controller device 335 is configured to consider the position of the user 310 relative to the position of the devices 315, 320, 325 and 330, when distributing and scheduling sound effects to the various devices 315, 320, 325 and 330. For instance, assume that a particular story takes place within a bee hive and includes ambient sound effects simulating bees flying all around the user 310. The controller 335 could consider the user's 310 position in distributing the ambient sound effects to the devices 315, 320, 325 and 330 for playback, so as to ensure the output of the sound effects creates an immersive and three-dimensional soundscape for the user. Thus, in this example, the controller 335 could schedule the sound of a bee buzzing to be output by each of the devices 315, 320, 325 and 330 with a time delay in between each output, so that the sound of the bee appears to repeatedly encircle the user 310 who is positioned roughly in between all of the devices 315, 320, 325 and 330.

Moreover, the controller 335 can be configured to dynamically update the playback schedule and the devices used in the playback in real-time, as the position of the user 310 and the various devices changes. For instance, as the devices move throughout the physical environment (e.g., when carried by a user, when moving on their own, etc.), the controller 335 could dynamically update the playback schedule of the bee buzzing sound effect to maintain the effect of the sound encircling the user 310. For example, a first sequential playback order for the bee buzzing sound effect could be devices 315, device 320, controller device 335, device 330 and then device 325, which could repeat indefinitely provided the devices 315, 320, 325, 330 and 325 and the user 310 remain in their depicted positions. However, if as part of the story playback the devices 315 and 330 move throughout the physical environment and change positions, the controller device 335 could update the sequential playback order to be device 330, device 320, controller device 335, device 315 and then device 325.

As discussed above, in some situations a storytelling device may be unable to play a particular audio effect if the audio effect is represented using entirely uncompressed or raw audio data (e.g., due to excessive delays in transmitting the raw audio data to the device, due to a lack of sufficient memory for storing the raw audio data on the device, etc.). Additionally, while the storytelling device may be able to output the audio effect when the audio effect is represented using compressed data, such a technique fails to distinguish between more important and less important portions of the audio effect. As such, embodiments can be configured to selectively encode an audio effect using a variable bit rate audio encoding, where a higher bit rate is assigned to portions of the audio effect that are deemed more important for the story.

Figures 4, 5:
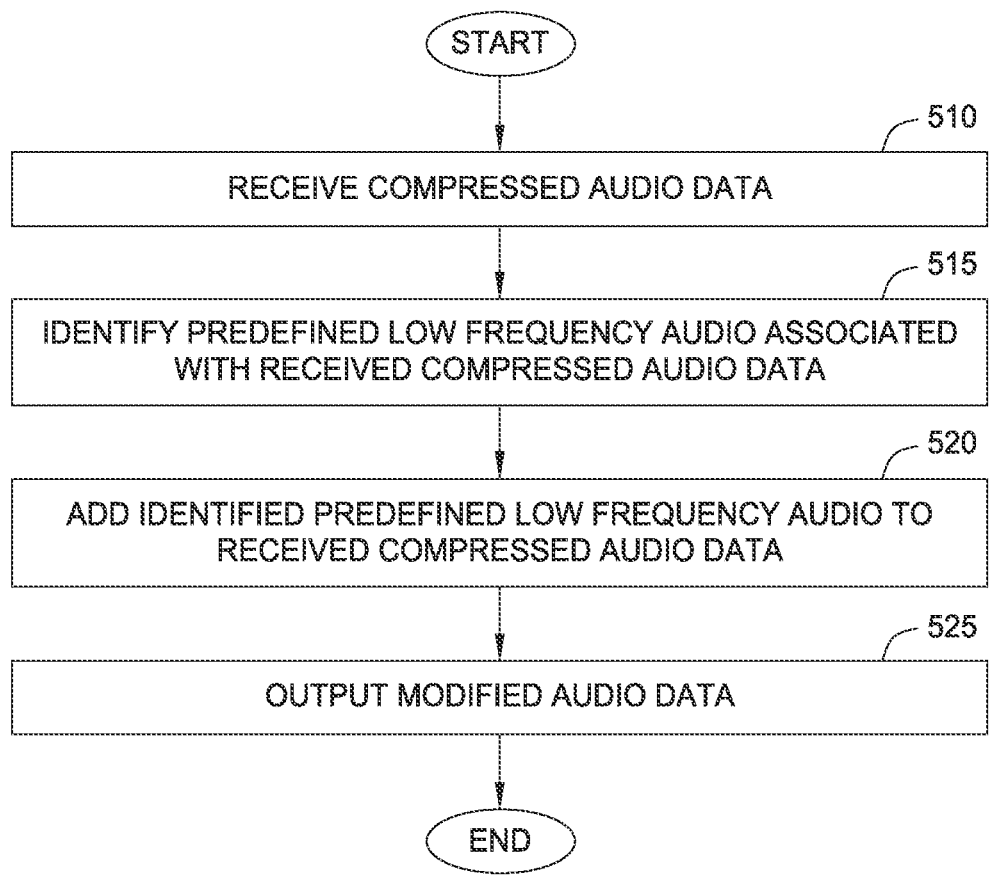
FIG. 4 illustrates an audio file containing uncompressed data and variable rate compressed data, according to one embodiment described herein.
FIG. 5 is a flow diagram illustrating a method for altering audio data, according to one embodiment described herein.

An example of such an audio file is shown in FIG. 4, which illustrates an audio file containing uncompressed data and variable rate compressed data, according to one embodiment described herein. As shown, the audio data 400 includes a portion of uncompressed audio data 410, a portion of high bit rate audio data 420 and a portion of low bit rate audio data 430. Here, a controller component has determined that the initial portion of the audio effect is the most important portion of the audio effect while a latter portion of the audio effect is the least important portion. As such, the controller component has encoded the audio data 400 such that the first portion includes uncompressed audio data 410, which transitions into a high bit rate encoding of compressed audio data 420 and finally transitions into a low bit rate encoding of compressed audio data 430. By encoding the audio data 400 in the depicted fashion, as opposed to a uniform compression of the audio data, embodiments can improve the sound quality of more important portions of the audio effect while still providing a reduced overall size of the audio data 400. Moreover, a user may perceive even the lower bit rate encoding as a higher quality sound effect, due to cognitive dissonance and the user associating the sound produced by outputting the lower bit rate encoding with the higher sound quality produced by outputting the uncompressed audio data 410 and high bit rate audio data 420.

In some embodiments, a device may be limited in audio processing and storage capabilities and may be capable of only playing back heavily compressed audio data. However, when such audio data is heavily compressed, the compressed audio data may lose a substantial portion of high and low frequency sound due to the compression, while still retaining a significant portion of mid range sounds. As a result, the sound quality of the heavily compressed audio data may be relatively poor, relative to less compressed or raw audio data. As such, embodiments can be configured to augment compressed audio data by adding predefined low frequency audio data (e.g., a generic bass sound effect), in order to improve the sound quality of the compressed audio data while maintaining the heavy rate of compression.

FIG. 5 is a flow diagram illustrating a method for altering audio data, according to one embodiment described herein. As shown, the method 500 begins at block 510, where logic on an interactive storytelling device receives compressed audio data. The logic then identifies a predefined low frequency audio associated with the received compressed audio data (block 515). That is, the logic may be configured with multiple distinct instances of generic low frequency audio data, with each instance of data corresponding to a different type of sound effect (e.g., a weapon discharge, ambient noise, an explosion, etc.). Thus, the logic could determine the type of the received compressed audio data (e.g., a weapon discharge sound effect) and could select the predefined low frequency audio associated with the determined type.

Upon retrieving the predefined low frequency audio data, the logic is configured to insert the low frequency audio data to the compressed audio data (block 520). The logic then outputs the modified audio data (block 525) and the method 500 ends. Doing so helps to improve the richness of the heavily compressed audio data, while still preserving the high rate of compression and accompanying file size of the compressed audio data.

In one embodiment, the logic is configured to add the low frequency sounds to the entire length of the compressed audio data. In a particular embodiment, the logic is configured to selectively add the low frequency sounds to the compressed audio data. For instance, the logic could insert the low frequency sound data into the compressed audio data only at portions compressed audio data that include a threshold volume of sound. For example, the logic could insert the low frequency sound data into portions of the compressed audio data that contain a sufficient volume of sound, while avoiding inserting the low frequency sound data into portions of the compressed audio data that are silent. Doing so helps to preserve the characteristics of the compressed audio data while improving the overall richness and sound quality of the compressed audio data.

In one embodiment, logic on an interactive device is configured to generate a sound effect by applying Musical Instrument Digital Interface (MIDI) control operations to one or more instances of sound data. Doing so allows a single instance of audio data to be used for multiple purposes without consuming any additional storage resources on the interactive device. For example, sound data representing the sound of a toy plane's engine could be altered using one or more MIDI control operations to increase the pitch of the sound effect, in order to simulate the plane travelling further from the user.

Figure 6:
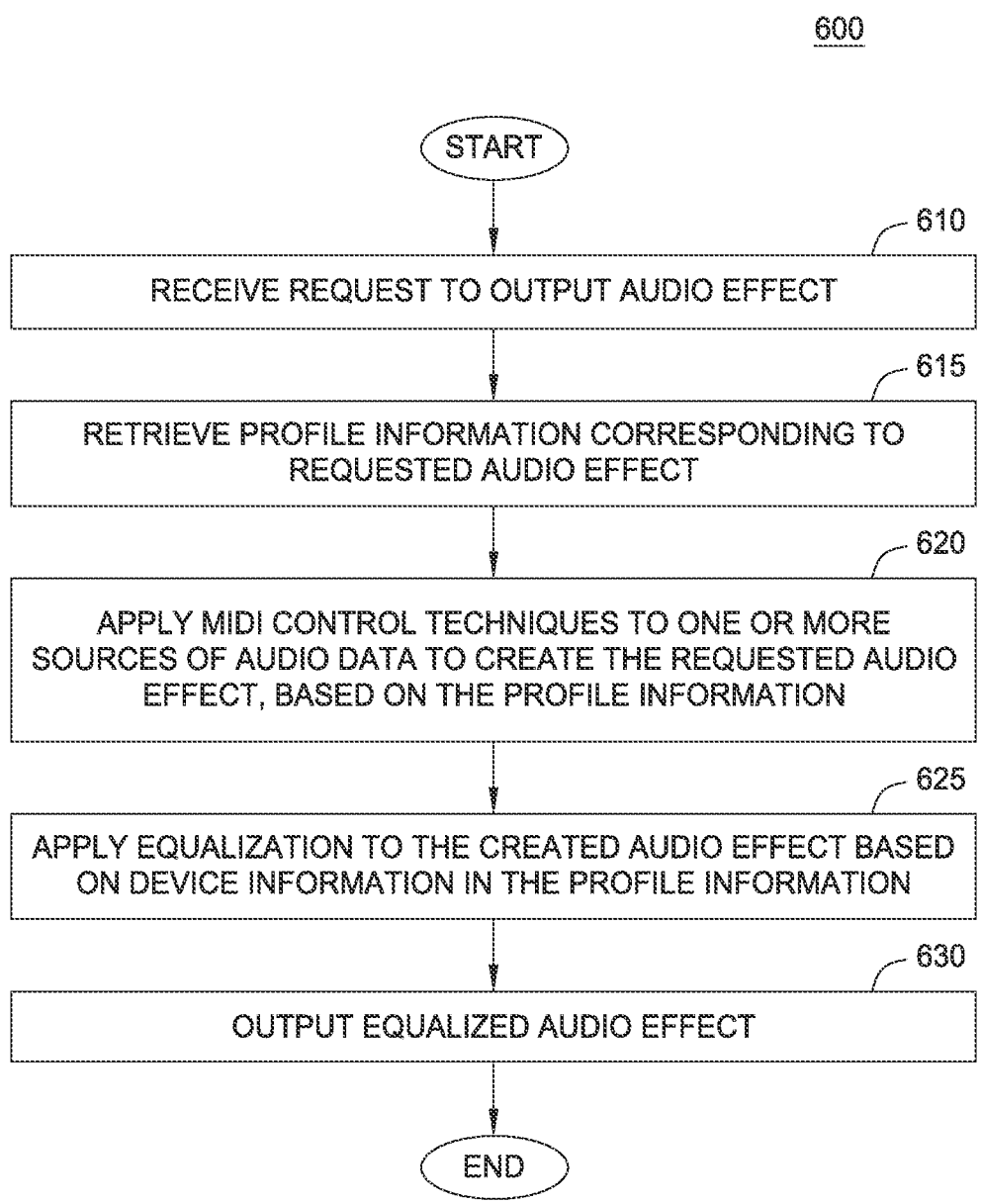
FIG. 6 is a flow diagram illustrating a method of creating audio data for output on a particular storytelling device, according to one embodiment described herein.

FIG. 6 is a flow diagram illustrating a method of creating audio data for output on a particular storytelling device, according to one embodiment described herein. As shown, the method 600 begins at block 610, where the logic receives a request to output an audio effect. Upon receiving the request, the logic retrieves profile information corresponding to the requested audio effect (block 615). Generally, the profile information represents data that can indicate how to generate the requested audio effect and can further indicate parameters for outputting the generated audio effect for playback. For example, the profile information could specify one or more sources of audio data to be used to generate the requested audio effect and could further specify equalizer parameters for use in outputting the generated audio effect for playback.

The logic then applies one or more MIDI control techniques to one or more sources of audio data in order to generate the requested audio effect, based on the profile information (block 620). For example, the logic could employ MIDI control operations to combine a portion of a source audio data file with a portion of another source audio data file in order to generate the requested audio effect. Generally, any number of source audio files can be combined in order to generate the requested audio effect, or the audio effect could be generated from a portion of only a single source audio file. Advantageously, doing so allows the logic to generate multiple distinct audio effects from the source audio files and to conserve storage space by reusing portions of the source audio files for multiple generated audio effects.

The logic then applies equalization parameters to the created audio effect based on device information specified in the retrieved profile (block 625). Generally, the equalization parameters represent predefined data for use with outputting audio effects on the interactive device in order to achieve an optimal sound quality. For example, a particular device may be configured with speakers that are incapable of producing very low frequency sounds. In such an example, the equalization parameters could specify to reduce the volume of the low frequency sounds when outputting the generated audio effect on the particular device, as the device's speakers are incapable of playing back these low frequency sounds properly and excessive low frequency sounds in the generated audio may result in distortion from the device's speakers. As another example, for a device capable of producing rich sound for both high and low frequencies, the equalization parameters could be configured to augment the high and low frequency sounds of the generated audio effect in order to take advantage of the improved speaker device(s) of the interactive device. Once the equalization parameters are applied to the generated audio effect, the audio effect is output for playback (block 630) and the method 600 ends.

In one embodiment, the equalization parameters can be used to soften certain sound effects being output on the interactive device, so that a particular sound effect is more audible to the user. For example, a blaster rifle interactive device could be outputting laser blast sound effects responsive to a user depressing the device's trigger mechanism and could also be assigned to playback dialogue from the character Jarvis in order to provide instructions for progressing the story to the user. In such an example, the device could be configured to apply equalization parameters to the laser blast sound effects in order to reduce the volume of these sounds effects, while amplifying the sound effects of Jarvis' voice. By doing so, embodiments help to ensure that the use can clearly understand Jarvis' instructions which can be important to the advancement of the story.

In a particular embodiment, the controller device is configured to also instruct other interactive devices involved in the story to apply equalization parameters to their currently playing audio, so as to soften the sound being played by these devices and to allow the user to better hear another audio effect being output from a different device. The controller device may be configured to give such an instruction when, for instance, a high priority or otherwise important sound effect is scheduled to be played by one of the devices (e.g., dialogue from the character Jarvis' that is important to the advancement of a story). Doing so helps to ensure that the user does not get overwhelmed by multiple sound effects all being played at once and miss hearing an audio effect or piece of information that is important to the advancement of the story.

Technical Description

Figure 7:
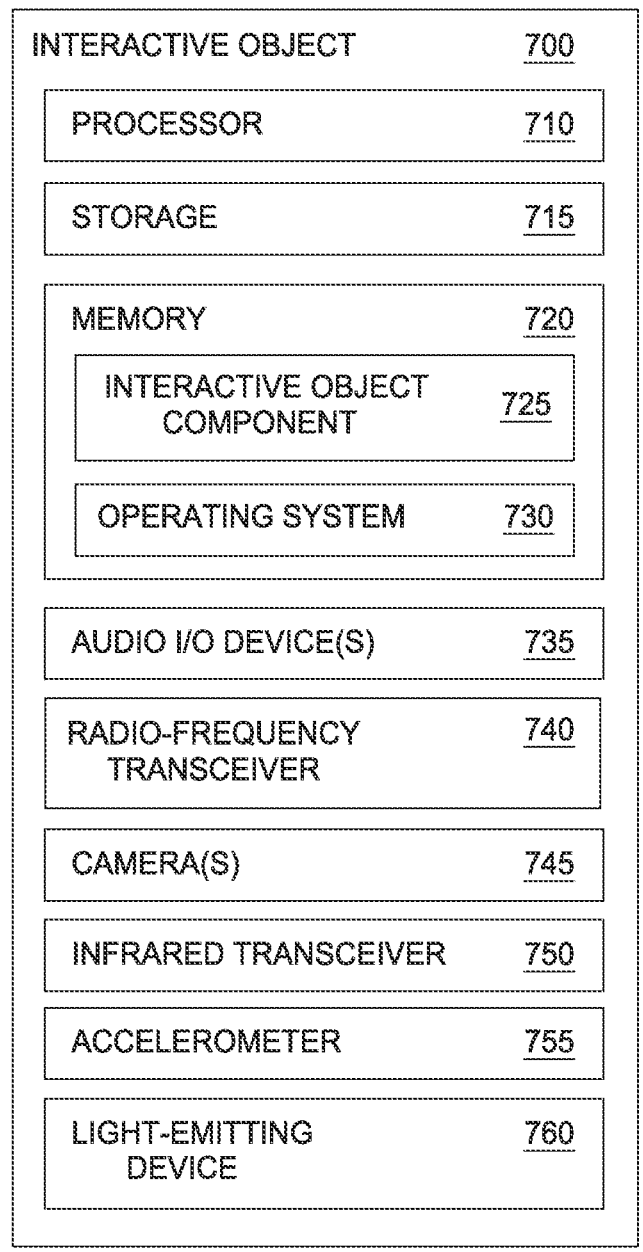
FIG. 7 is a block diagram illustrating an interactive object, according to one embodiment described herein.

An example of an interactive device is shown in FIG. 7, which is a block diagram illustrating an interactive device configured with an interactive object component, according to one embodiment described herein. In this example, the device 700 includes, without limitation, a processor 710, storage 715, memory 720, audio input/output (I/O) device(s) 735, a radio-frequency (RF) transceiver 740, a camera device(s) 745, an infrared transceiver 750, an accelerometer device 755, and a light-emitting device 760. Generally, the processor 710 retrieves and executes programming instructions stored in the memory 720. Processor 710 is included to be representative of a single CPU, multiple CPUs, a single CPU having multiple processing cores, GPUs having multiple execution paths, and the like. The memory 720 is generally included to be representative of a random access memory. The radio-frequency transceiver 740 enables the interactive object component 725 to connect to a data communications network (e.g., wired Ethernet connection or an 802.11 wireless network). As discussed above, the interactive device may include one or more battery devices (not shown).

Further, while the depicted embodiment illustrates the components of a particular interactive device, one of ordinary skill in the art will recognize that interactive devices may use a variety of different hardware architectures. For instance, in one embodiment the controller component logic is implemented as hardware logic. Examples of such hardware logic include, without limitation, an application-specific integrated circuit (ASIC) and a field-programmable gate array (FPGA). Moreover, it is explicitly contemplated that embodiments may be implemented using any device or computer system capable of performing the functions described herein.

Returning to the embodiment depicted in FIG. 7, the memory 720 represents any memory sufficiently large to hold the necessary programs and data structures. Memory 720 could be one or a combination of memory devices, including Random Access Memory, nonvolatile or backup memory (e.g., programmable or Flash memories, read-only memories, etc.). In addition, memory 720 and storage 715 may be considered to include memory physically located elsewhere; for example, on another computer communicatively coupled to the interactive device 700. Illustratively, the memory 720 includes an interactive object component 725 and an operating system 730. The interactive object component 725 could be configured to receive commands (e.g., encoded in RF or infrared signals) and to execute the commands to perform audiovisual effects. In one embodiment, the interactive object component 725 is configured to decrypt the commands using a received key before executing the commands. The operating system 730 generally controls the execution of application programs on the interactive device 700. Examples of operating system 730 include UNIX, a version of the Microsoft Windows® operating system, and distributions of the Linux® operating system. Additional examples of operating system 730 include custom operating systems for gaming consoles, including the custom operating systems for systems such as the Nintendo DS® and Sony PSP®.

The infrared transceiver 750 represents any device capable of sending and receiving infrared signals. In another embodiment, a device 700 that only sends or receives infrared signals may be configured with an infrared transmitter or a infrared receiver, respectively, as opposed to the infrared transceiver 750. The sound I/O devices 735 could include devices such as microphones and speakers. For example, the speakers could be used to produce sound effects (e.g., explosion sound effects, dialogue, etc.) and/or to produce vibration effects.

Generally, the interactive object component 725 provides logic for the interactive device 700. For example, the interactive object component 725 could be configured to detect that a coded infrared signal has been received (e.g., using the infrared transceiver 750). The interactive object component 725 could then determine a type of the infrared signal (e.g., based on data specified within the coded infrared signal) and could determine a corresponding response based on determined type. For example, the interactive object component 725 could determine that the infrared signal specifies that a repulsor ray blast sound effect should be played, and, in response, could output the specified sound effect using audio I/O devices 735. As another example, the signal could be encoded with data specifying that a particular lighting effect should be displayed according to a specified schedule (e.g., at a particular point in time), and the interactive object component 725 could monitor the schedule (e.g., using an internal clock) and could activate the appropriate light-emitting device 760 at the appropriate time.

Figure 8:
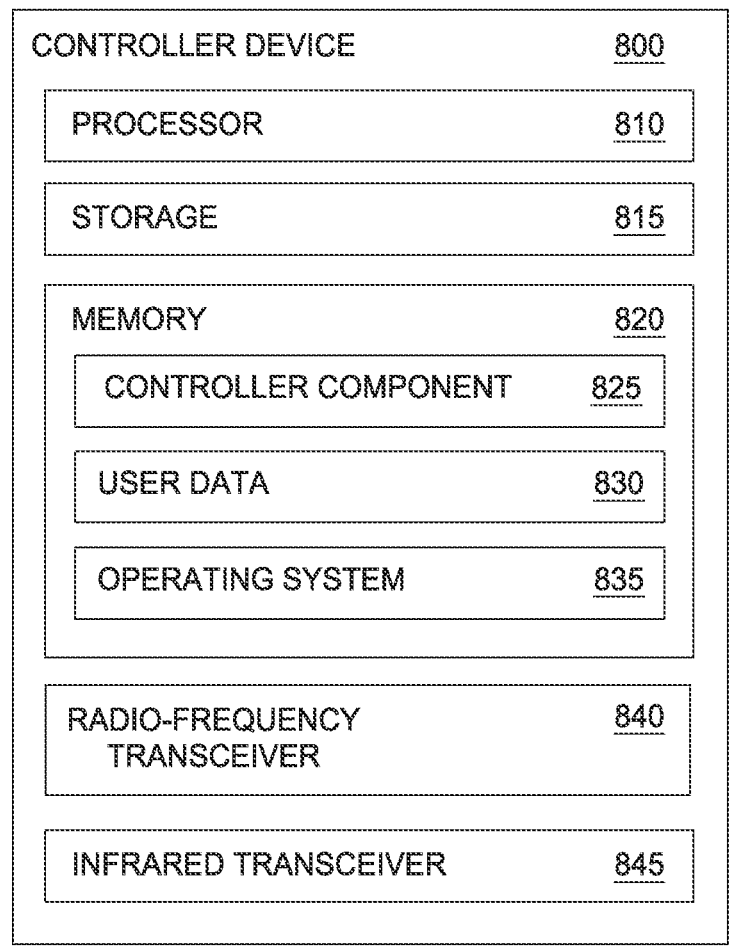
FIG. 8 is a block diagram illustrating a controller device, according to one embodiment described herein.

FIG. 8 illustrates an example of a controller device, according to one embodiment described herein. As shown, the controller 800 includes a processor 810, storage 815, memory 820, a radio-frequency transceiver 840 and an infrared transceiver 845. Generally, the processor 810 retrieves and executes programming instructions stored in the memory 820. Processor 810 is included to be representative of a single CPU, multiple CPUs, a single CPU having multiple processing cores, GPUs having multiple execution paths, and the like. The memory 820 is generally included to be representative of a random access memory. The radio-frequency transceiver 840 enables the controller device 800 to transmit and receive radio-frequency signals. Likewise, the infrared transceiver 845 allows the device 800 to transmit and receive infrared signals. Further, while the depicted embodiment illustrates the components of a particular controller device 800, one of ordinary skill in the art will recognize that interactive objects may use a variety of different hardware architectures. Moreover, it is explicitly contemplated that embodiments may be implemented using any device or computer system capable of performing the functions described herein.

The memory 820 represents any memory sufficiently large to hold the necessary programs and data structures. Memory 820 could be one or a combination of memory devices, including Random Access Memory, nonvolatile or backup memory (e.g., programmable or Flash memories, read-only memories, etc.). In addition, memory 820 and storage 815 may be considered to include memory physically located elsewhere; for example, on another computer communicatively coupled to the controller device 800. Illustratively, the memory 820 includes a controller component 825, user data 830 and an operating system 835. The operating system 835 generally controls the execution of application programs on the controller device 800. Examples of operating system 835 include UNIX, a version of the Microsoft Windows® operating system, and distributions of the Linux® operating system. Additional examples of operating system 835 include custom operating systems for gaming consoles, including the custom operating systems for systems such as the Nintendo DS® and Sony PSP®.

Generally, the controller component 825 configures the interactive objects (e.g., toys 110, 115 and 120, or an action disc device 200) to perform particular actions. The particular actions can also be based on the user data 830 (e.g., historical interactions data between the user and various interactive objects, user preferences data, etc.) and one or more environmental factor (e.g., a room of the house the object is currently in, a time of day, a day of the week, etc.). For instance, in one embodiment, the controller component 825 is configured with logic for recognizing particular events and broadcasting commands for the devices to perform a corresponding action(s) in response. In such an embodiment, the controller component 825 could use input/output devices (e.g., cameras, microphones, wireless transceivers, infrared sensors, etc.) to detect when a particular event occurs. For instance, the controller component 825 could use a camera to detect when a particular projection appears, and could then broadcast a command (e.g., using a RF signal) instructing the devices to perform a corresponding action in response. As another example, the controller component 825 could receive a wireless signal (e.g., an RF signal, data communicated using Bluetooth communications, etc.) from another one of the devices, indicating that a particular action has been performed. The device could then broadcast a signal instructing one or more other devices to perform a corresponding action responsive to receiving the signal.

In a particular embodiment, the controller component 825 is configured to control the actions of multiple devices to cause the devices to perform audiovisual effects synchronously. For instance, the controller component 825 could broadcast a message to the devices, instructing the devices to perform a particular audiovisual effect immediately upon receiving the message. As another example, the controller component 825 could broadcast a message to the devices, instructing the devices to perform actions (e.g., play a sound effect, trigger a lighting effect, etc.) according to a schedule. Here, the devices may maintain internal clocks that are synchronized with one another for use in synchronously performing the audiovisual actions.

As discussed above, the controller component 825 can be configured to dynamically optimize the playback of audio on various interactive devices used in the playback of the story. Such alterations can include, without limitation, variable bit rate encodings of audio files, generating audio data using MIDI control operations, applying equalization parameters to alter audio data, scheduling multiple devices to output sound effects according to a schedule to give the impression of stereophonic or surround-sound, and so on. Doing so helps to provide a more immersive soundscape during the playback of a story.

Generally speaking, the devices and the controller 800 may be implemented in any number of different ways, consistent with the present disclosure. With respect to hardware, embodiments may employ a modular design for maximum hardware reusability across different interactive objects. Such a design could include, for instance, hardware adapters that allow common processors, memories and buses to receive and send data via a multiplicity of sensors, displays, effectors and other means of communication. Additionally, system and/or operating system agnostic sites (e.g., Portals) could be used to ensure maximum compatibility for all users.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A non-transitory computer-readable medium containing computer program code, that, when executed, performs an operation comprising:
   selecting a device from a plurality of devices within a physical environment for use in outputting an audio effect;

upon determining that transmitting the audio effect as uncompressed data to the selected device would violate a predefined performance criteria, based on determining that the selected device includes insufficient processing resources for processing the audio effect as uncompressed data, modifying the audio effect, comprising:

determining, for each of a plurality of portions of the audio effect, a respective priority; and upon determining that a first portion of the plurality of portions of the audio effect is a lower priority, relative to a second portion of the audio effect, compressing the first portion of the audio effect, wherein the second portion of the audio effect remains uncompressed; and transmitting the modified audio effect to the selected device for playback, wherein the selected device is configured to, upon receiving the transmitted modified audio effect:

identify predefined low-frequency audio data associated with the transmitted modified audio effect, wherein the predefined low-frequency audio data comprises a low-frequency sound effect;

combine the identified predefined low-frequency audio data with the transmitted modified audio effect to produce combined audio data, such that the low-frequency sound effect is added to the modified audio effect; and output the combined audio data for playback.

2. The non-transitory computer-readable medium of claim 1, wherein the first portion of the audio effect is compressed at a first bit rate, and wherein modifying the audio effect further comprises:

upon determining that a third portion of the plurality of portions of the audio effect is a lower priority relative to the second portion of the audio effect, and that the third portion is a higher priority relative to the first portion of the audio effect, compressing the third portion of the audio effect at a second bit rate that is higher than the first bit rate.

3. The non-transitory computer-readable medium of claim 1, wherein determining that transmitting the audio effect as uncompressed data to the selected device would violate a predefined performance criteria is further based on determining that the selected device contains insufficient memory resources for storing the audio effect as uncompressed data.

4. The non-transitory computer-readable medium of claim 1, wherein the modified audio effect is transmitted to the selected device using a first network connection, and wherein determining that transmitting the audio effect as uncompressed data to the selected device would violate the predefined performance criteria further comprises:

determining that the audio effect is scheduled for playback at a first moment in time on the selected device; and determining that the first network connection has insufficient bandwidth to transmit the audio effect as uncompressed data to the selected device for playback at the first moment in time.

5. The non-transitory computer-readable medium of claim 1, wherein selecting a device from a plurality of devices within a physical environment for use in outputting an audio effect further comprises:

determining respective audio playback capabilities for each of the plurality of devices; and selecting the device from the plurality of devices, based on the determined audio playback capabilities.

6. The non-transitory computer-readable medium of claim 1, wherein the selected device is configured to, upon receiving the transmitted modified audio effect:

retrieve equalizer profile information corresponding to the received modified audio effect;

apply equalization to the received modified audio effect, based on the retrieved equalizer profile; and output the equalized audio effect for playback.

7. The non-transitory computer-readable medium of claim 1, wherein the plurality of devices comprise storytelling devices belonging to a first playgroup within a storytelling environment.

8. The non-transitory computer-readable medium of claim 1, the operation further comprising:

determining a user position within the physical environment, wherein selecting the device from a plurality of devices within a physical environment for use in outputting the audio effect is further based on the determined user position.

9. A storytelling device, comprising:

a processor;

a communication module; and a memory containing an audio effect and a program that, when executed by the processor, performs an operation comprising:

selecting a second storytelling device from a plurality of storytelling devices within a physical environment for use in outputting the audio effect;

upon determining that transmitting the audio effect as uncompressed data to the selected second storytelling device would violate a predefined performance criteria, based on determining that the selected device includes insufficient processing resources for processing the audio effect as uncompressed data, modifying the audio effect, comprising:

determining, for each of a plurality of portions of the audio effect, a respective priority; and upon determining that a first portion of the plurality of portions of the audio effect is a lower priority, relative to a second portion of the audio effect, compressing the first portion of the audio effect, wherein the second portion of the audio effect remains uncompressed; and transmitting the modified audio effect to the selected device for playback, wherein the selected device is configured to, upon receiving the transmitted modified audio effect:

identify predefined low-frequency audio data associated with the transmitted modified audio effect, wherein the predefined low-frequency audio data comprises a low-frequency sound effect;

combine the identified predefined low-frequency audio data with the transmitted modified audio effect to produce combined audio data, such that the low-frequency sound effect is added to the modified audio effect; and output the combined audio data for playback.

10. The storytelling device of claim 9, wherein the first portion of the audio effect is compressed at a first bit rate, and wherein modifying the audio effect further comprises:

upon determining that a third portion of the plurality of portions of the audio effect is a lower priority relative to the second portion of the audio effect, and that the third portion is a higher priority relative to the first portion of the audio effect, compressing the third portion of the audio effect at a second bit rate that is higher than the first bit rate.

11. The storytelling device of claim 9, wherein determining that transmitting the audio effect as uncompressed data to the selected second storytelling device would violate the predefined performance criteria is further based on determining that the selected device contains insufficient memory resources for storing the audio effect as uncompressed data.

12. The storytelling device of claim 9, wherein the modified audio effect is transmitted to the selected second storytelling device using a first network connection, and wherein determining that transmitting the audio effect as uncompressed data to the selected second storytelling device would violate the predefined performance criteria further comprises:
  determining that the audio effect is scheduled for playback at a first moment in time on the selected second storytelling device; and
  determining that the first network connection has insufficient bandwidth to transmit the audio effect as uncompressed data to the selected second storytelling device for playback at the first moment in time.

13. The storytelling device of claim 9, wherein selecting a second storytelling device from a plurality of storytelling devices within a physical environment for use in outputting an audio effect further comprises:
  determining respective audio playback capabilities for each of the plurality of storytelling devices; and
  selecting the second storytelling device from the plurality of storytelling devices, based on the determined audio playback capabilities.

14. The storytelling device of claim 9, wherein the selected second storytelling device is configured to, upon receiving the transmitted modified audio effect:
  retrieve equalizer profile information corresponding to the received modified audio effect;
  apply equalization to the received modified audio effect, based on the retrieved equalizer profile; and
  output the equalized audio effect for playback.

15. The storytelling device of claim 9, the operation further comprising:
  determining a user position within the physical environment,
  wherein selecting the device from a plurality of devices within a physical environment for use in outputting the audio effect is further based on the determined user position.

16. A storytelling device, comprising:
  a processor;
  a communication module; and
  a memory containing an audio effect and a program that, when executed by the processor, performs an operation comprising:
    receiving, from a controller device, a modified audio effect for output;
    identifying predefined low-frequency audio data associated with the transmitted modified audio effect, wherein the predefined low-frequency audio data comprises a low-frequency sound effect;
    determining that the first portion of the audio effect has been compressed, while the second portion of the audio effect remains uncompressed;
    combining the identified predefined low-frequency audio data with the transmitted modified audio effect to produce combined audio data, such that the low-frequency sound effect is added to the modified audio effect, wherein the identified predefined low-frequency audio data is combined only with the first portion of the audio effect that has been compressed and not with the second portion of the audio effect that remains uncompressed; and
    outputting the combined audio data for playback.

17. The storytelling device of claim 16, the operation further comprising:
  retrieving equalizer profile information corresponding to the received modified audio effect; and
  apply equalization to the combined audio data, based on the retrieved equalizer profile,
  wherein the equalized combined audio data is output for playback.

18. The storytelling device of claim 16, wherein the operation further comprises:
  determining that the audio effect belongs to a first type of a plurality of types of audio effects; and
  selecting the predefined low-frequency audio data, from a plurality of instances of predefined low-frequency audio data, that corresponds to the determined first type of audio effect, wherein each of the plurality of instances of predefined low-frequency audio data corresponds to a respect type of audio effect.

19. The storytelling device of claim 16, wherein the operation further comprises:
  determining one or more portions of the transmitted modified audio effect having a measure of volume that is above a predefined threshold level of volume,
  wherein the identified predefined low-frequency audio data is combined only with the one or more portions of the audio effect having the measure of volume that is above a predefined threshold level of volume.

* * * * *